Figures 1, 5:
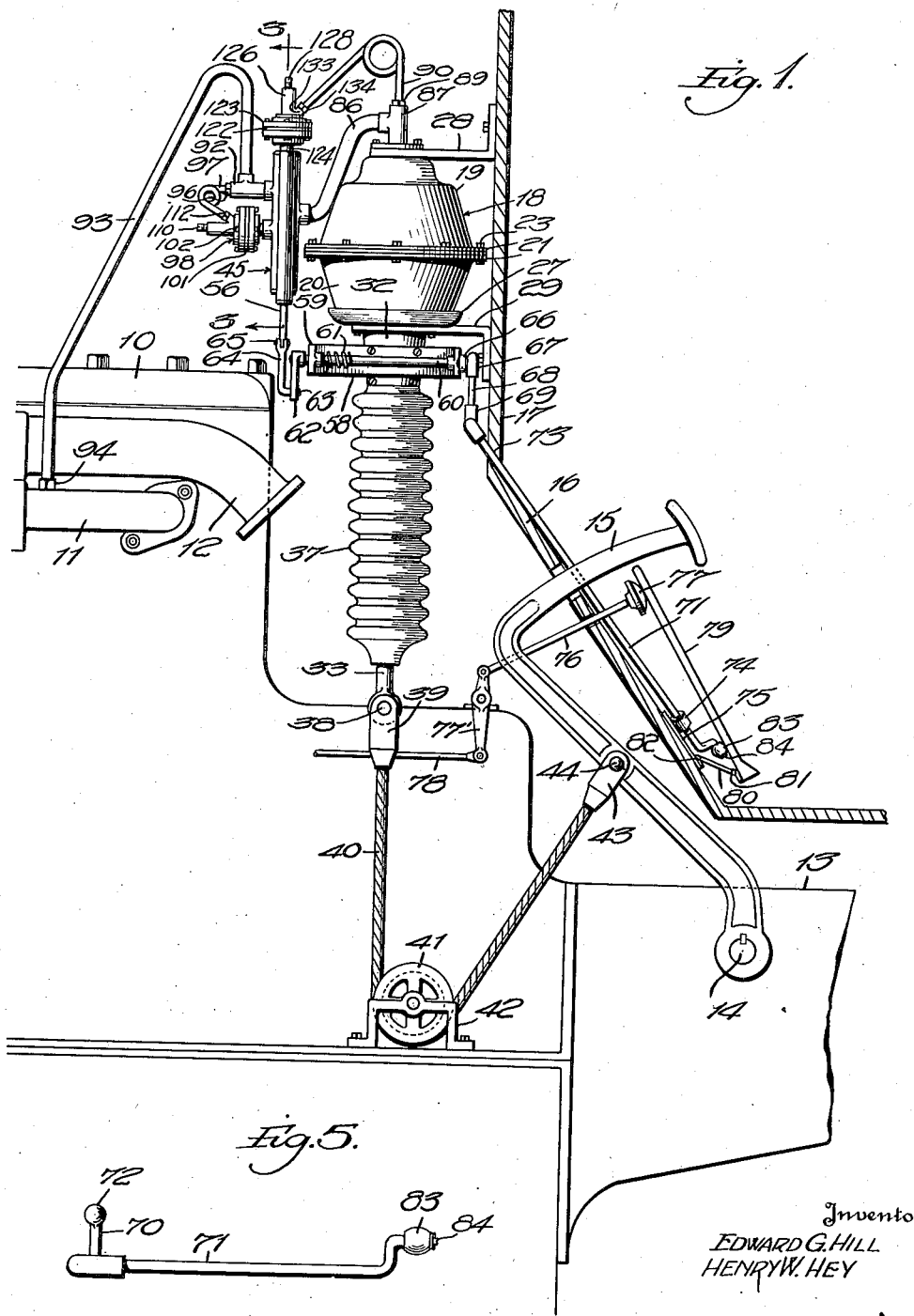

Aug. 4, 1936.   E. G. HILL ET AL   2,049,737
CLUTCH CONTROL DEVICE FOR MOTOR VEHICLES
Filed Jan. 19, 1932   2 Sheets-Sheet 1

Inventors
EDWARD G. HILL
HENRY W. HEY

By C. L. Parker, Jr.
Attorney

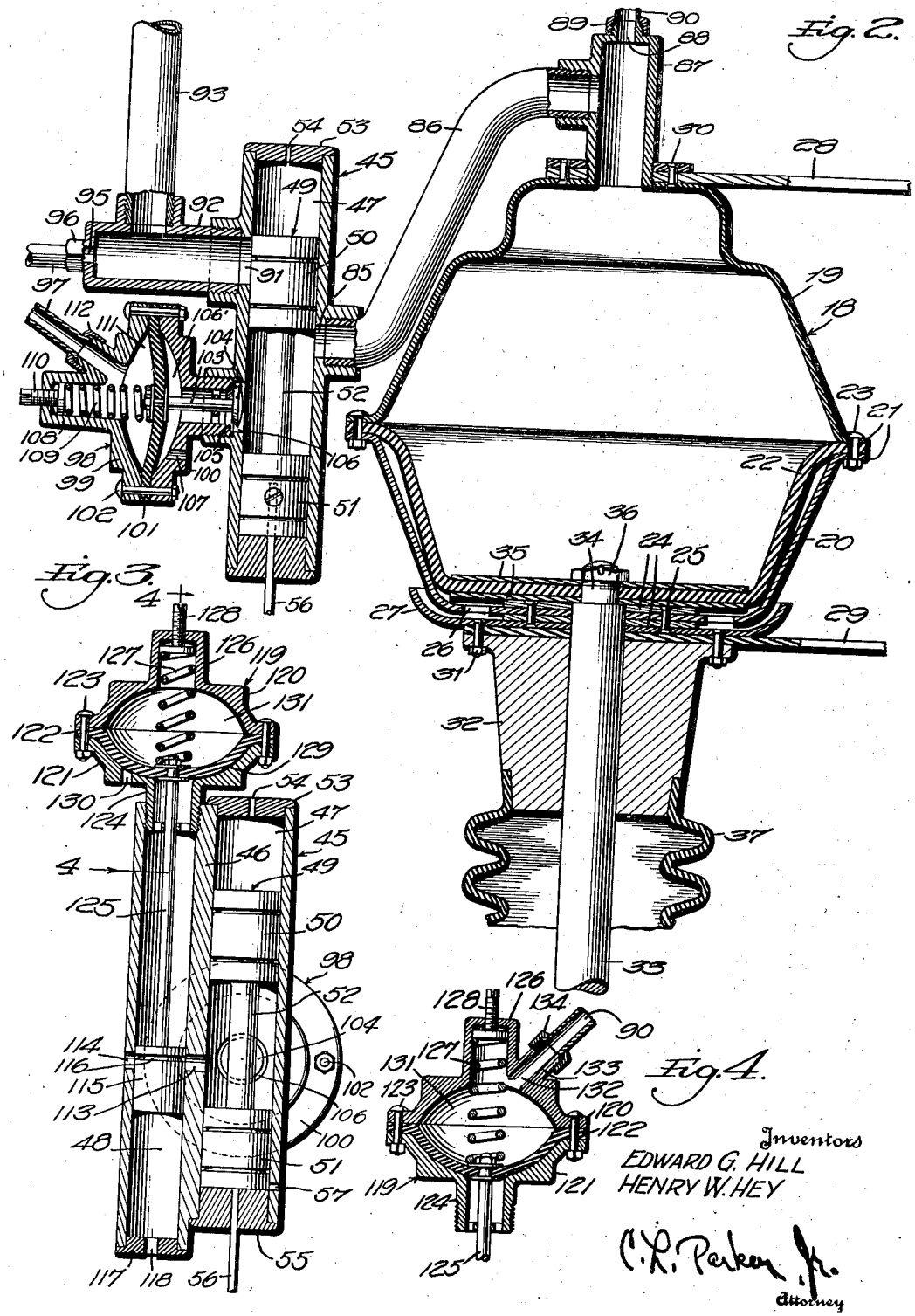

UNITED STATES PATENT OFFICE 2,049,737

CLUTCH CONTROL DEVICE FOR MOTOR VEHICLES

Edward G. Hill and Henry W. Hey, Richmond, Va., assignors to Hill Engineering Corporation, Richmond, Va., a corporation of Virginia Application January 19, 1932, Serial No. 587,578

24 Claims. (Cl. 192—.01)

This invention relates to clutch control devices for motor vehicles.

In our copending application Serial No. 578,394, we have described and claimed a clutch operating device for motor vehicles which constituted an improvement over the devices disclosed in the copending application of Edward G. Hill, Serial Nos. 487,319, filed October 8th, 1930, and 537,155, filed May 13th, 1931. In each of the copending applications referred to there is disclosed a power mechanism particularly adapted for use in operating and controlling the clutch of a motor vehicle. In these prior constructions, the power mechanism preferably is in the form of a differential pressure operated power device which is operable from any suitable source of differential pressure such as the vacuum of the intake manifold of a motor vehicle engine.

In each of the prior mechanisms, the power device is operable for disengaging the clutch elements and subsequently controlling their return movement to operative engagement in such a manner as to provide relatively rapid movement of the clutch elements to a point where engagement of the clutch elements is about to take place, and then retarding further movement to prevent "grabbing" of the clutch elements.

The present invention is an improvement over the prior structures referred to and is principally concerned with the automatic retarding or arresting of the clutch elements as they are about to come into engagement with each other as the clutch elements are being returned to normal engaging position. The means employed for this purpose in the prior constructions referred to have been found to be completely operative and practicable, but their proper operation is dependent upon fairly accurate adjustment of the parts, and upon readjustment as the elements of the clutch become worn, or as readjustment of the clutch elements are required for any reason.

An important object of the present invention is to provide automatic means operable in conjunction with a clutch operating device for arresting or retarding the movement of the clutch elements as they are about to come into operative engagement with each other.

A further object is to provide an apparatus of the character referred to wherein fine accuracy of adjustment is unnecessary and wherein perfect operation takes place indefinitely regardless of the adjustment of the clutch elements.

A further object is to provide novel means which is automatically operative for arresting the movement of the clutch elements toward operative position in engagement with each other and which depends for its operation on the effect produced as the clutch elements initially contact with each other prior to the time at which such contact becomes operative for propelling the vehicle.

A further object is to provide an apparatus of the character referred to which is particularly adapted for use in connection with a differential pressure operated clutch control device and wherein the change in differential pressure in the power device which takes place when the clutch elements come into initial engagement is utilized for arresting the movement of the clutch elements at such point to permit the full return of the clutch elements into operative engagement to be smoothly and accurately controlled.

A further object is to provide an apparatus of the character just referred to in combination with novel means controlled by the degree of suction of the intake manifold for determining the rate of movement of the clutch elements into operative engagement.

Other objects and advantages of the invention will become apparent during the course of the following description.

In the drawings we have shown one embodiment of the invention. In this showing,

Figure 1 is a side elevation of the apparatus and parts of the vehicle mechanism to which it is attached, portions of the vehicle being shown in section, Figure 2 is a vertical sectional view taken axially through the power device and the main control valve associated therewith, Figure 3 is an enlarged sectional view on line 3—3 of Figure 1, Figure 4 is a section on line 4—4 of Figure 3 with the valve chest removed, and, Figure 5 is a detail plan view of the treadle rock shaft.

Referring to Figure 1, the numeral 10 designates the engine of a motor vehicle having the usual intake manifold 11 and exhaust manifold 12. The motor is provided with the usual clutch indicated as a whole by the numeral 13, and the control shaft 14 of the clutch extends from the casing thereof to be operated by a pedal 15 which may be conventional in construction, as shown. The upper end of the pedal 15 extends through the usual opening in a sloping floor board 16 connected at its upper end to the dash 17 of the vehicle.

The differential pressure power device is illustrated in Figure 2 and is designated as a whole by the numeral 18. The power device comprises upper and lower casing sections 19 and 20 having parallel adjacent annular flanges 21 which receive therebetween the annular edge portion of a diaphragm 22. The flanges 21 are secured tightly against the edge of the diaphragm by bolts 23 or other suitable fastening elements.

Disks 24 are secured by rivets 25 against opposite faces of the flat bottom of the casing section 20. Outwardly of the disks 24, the lower casing section is provided with vent openings 26 opened to the atmosphere. A cup 27 is arranged against the lower disk 24 and is secured thereto by the rivets 25 in spaced relation to the bottom of the casing section 20. Brackets 28 and 29 are adapted to secure the power device to the dash 17. The upper bracket 28 is secured against the top of the upper casing section 19 by rivets 30, while the lower bracket 29 is secured to the cup 27 by bolts 31. These bolts also operate to secure a bearing 32 against the bottom of the bracket 29.

The bearing 32 slidably receives a rod or shaft 33, and suitable openings are provided through the disks 24, the bottom of the lower casing section 20, the cup 27 and bracket 29, for the passage of the shaft 33 therethrough. The upper end of the shaft 33 is reduced as at 34, and the reduced end of the shaft passes through suitable openings formed in the center of the diaphragm 22 and in the center of disks 35 arranged against opposite sides of the diaphragm. The shoulder formed by the reduced end 34 of the shaft engages against the bottom disk 35, while a nut 36 is threaded on the upper end of the reduced end of the shaft and engages the upper disk 35. It will be apparent therefore that the shaft is fixed with respect to the diaphragm 22 to move upwardly and downwardly therewith in a manner to be described.

An expansible and contractible sleeve 37 surrounds the lower portion of the shaft 33 and has its upper end connected to and surrounding the lower end of the bearing 32, as shown in Figure 2. The lower end of the sleeve 37 is connected to the shaft 33 at a point spaced a substantial distance beneath the bearing 32. The sleeve may be made of rubber or similar flexible material and operates to protect the shaft 33 against dirt or other foreign material, but permits free vertical movement of the shaft.

The lower end of the shaft 33, just below the sleeve 37, is pivotally connected as at 38 to a yoke 39 connected to one end of a flexible cable 40. This cable passes around a pulley 41 journalled in a suitable bearing bracket 42 mounted upon any stationary part of the vehicle, as will be apparent. The other end of the cable 40 is provided with a yoke 43 pivotally connected as at 44 to the clutch pedal 15. It will be apparent that upward movement of the shaft 33 exerts an upward pull on the adjacent end of the cable 40, which movement is transmitted to the opposite end of the cable to move the clutch pedal 15 downwardly to inoperative position.

Referring to Figures 2 and 3 the numeral 45 designates a valve chest as a whole divided by a central wall 46 to form valve chambers 47 and 48. A valve indicated as a whole by the numeral 49 is vertically movable in the chamber 47 and comprises upper and lower heads 50 and 51 connected by a reduced shank 52. The upper end of the chamber 47 is capped as at 53 and a vent opening 54 is provided in the cap to prevent variation in pressure above the valve 49. The lower end of the chamber 47 is provided with a head 55 through which a stem 56 is axially slidable, and the upper end of this stem is secured to the valve head 51. The lower end of the chamber 47 is vented to the atmosphere as at 57.

Any suitable means may be employed for operating the valve stem 56 to move the valve 50 to its upper and lower positions. One form of mechanism for operating the valve stem 56 is illustrated in the drawings. Referring to Figure 1, the numeral 58 designates a bracket secured against one side of the bearing 32 and provided with outstanding arms 59 rotatably supporting a rod 60. A spring 61 is connected between this rod and the bracket 58 in any suitable manner to tend to rotate the rod in one direction to maintain the valve 49 in its lower normal position shown in Figure 3, in a manner to be described. One end of the rod 60 is provided with an arm 62 pivotally connected as at 63 to one end of a link 64 and the upper end of this link is pivotally connected as at 65 to the lower end of the valve steam 56

The other end of the rod 60 is provided with an arm 66. The end of this arm is universally connected, as by means of a ball and socket joint 67, to the upper end of a link 68. The lower end of this link is similarly connected by a ball and socket joint 69 to an arm 70 carried by a rock shaft 71. The ball of the connection 69 is shown in Figure 5 and is designated by the numeral 72. The rock shaft 71 is journalled at one end in a suitable opening 73 drilled through the dash 17, while the rock shaft is journalled adjacent its opposite end in a bearing 74 connected by a suitable swivel means to a plate 75 secured against the floor board 16. The purpose of the swivel mounting of the bearing 74 is to permit the installation of the rock shaft 71 at different angles, which is necessary with installations on different makes of motor vehicles.

An accelerator rod 76 extends through the floor board 16 and is provided with the usual button 77 at its upper end. If the vehicle to which the device is to be applied is provided with an accelerator treadle in place of the button 77, the treadle may be removed and one of the buttons 77 threaded on the upper end of the accelerator rod 76. The lower end of the rod 76 is connected to one end of a pivoted lever 77', and the other end of this lever is connected to one end of a conventional throttle rod 78 leading to the throttle valve of the carburetor.

An operating treadle 79 is arranged as shown in Figure 1 with its forward end resting upon the button 77. A hinge member 80 is pivotally connected at its rear end to the lower end of the treadle as at 81, the other end of the hinge member being pivotally connected as at 82 to the plate 75. It will be apparent that the lower end of the treadle is adapted to be depressed regardless of the positions of the upper end of the treadle and the accelerator button 77. The lower end of the treadle is in operative engagement with a substantially spherical roller 83 carried by a crank arm 84 preferably formed integral with and offset from the lower end of the rock shaft 71. From the foregoing it will be apparent that depression of the lower end of the treadle 79, operating against the roller 83, rocks the shaft 71 about its axis.

As previously stated, the valve 50 normally occupies its lowermost position, as shown in Figures 2 and 3. The valve chest is provided with a port 85 communicating with the valve chamber 47 just below the head 50 when the valve 49 is in normal position. This port communicates with one end of a conduit 86, as shown in Figure 2. The other end of the conduit 86 is connected to the branch of a T 87, and the lower end of the run of the T is connected to the upper casing section 19 to communicate with the interior thereof. The upper end of the run of the T 87 is preferably reduced as at 88 and is connected by a union 89 to a pipe 90, for a purpose to be described. Above and preferably opposite the port 85, the valve chamber 47 is provided with a port 91 normally closed by the valve head 50 and adapted to be opened when the valve is moved to upper position. One end of the run of a T 92 is connected to the valve chest in communication with the port 91. The branch of the T 92 communicates with one end of a conduit 93, and the opposite end of this conduit is connected as at 94 to the intake manifold 11. The outer end of the run of the T 92 is preferably reduced as at 95 and is connected by a union 96 to one end of a pipe 97 for a purpose to be described. It will be apparent that the T's 87 and 92 may be exact duplicates of each other.

Referring to Figure 2, the numeral 98 designates a diaphragm housing as a whole comprising sections 99 and 100 having annular flanges between which the edge portion of a diaphragm 101 is secured by bolts 102. A valve stem 103 has one end connected to the diaphragm 101 and is provided at its opposite end with a valve 104 adapted to engage against a seat 105. This valve seat communicates with the chamber 47 through a port 106. The diaphragm 101 forms with the housing section 100 a chamber 106' which communicates with the atmosphere through a vent port 107.

The housing section 99 is provided with an integral hollow extension 108 in which is arranged a spring 109, and this spring acts to move the diaphragm 101 in one direction to tend to open the valve 104. A screw 110 is adapted to adjust the tension of the spring 109 to determine the differential pressure necessary to hold the valve 104 in closed position, as will become apparent. The diaphragm 101 forms with the housing 99 a suction chamber 111 which is connected to the other end of the pipe 97 by means of a union 112. It will be apparent that the chamber 111 is always in communication with the intake manifold through pipe 97, T 92 and conduit 93, while the port 107 is always in communication with the atmosphere. During the normal operation of a vehicle engine therefore, differential pressure is present on opposite sides of the diaphragm 101 tending to maintain the valve 104 in closed position. The valve 104 and its operating means per se are described and claimed in our copending application Serial No. 578,394, referred to above.

The wall 46 dividing the valve chambers 47 and 48 is provided with a port 113 affording communication under certain conditions between the chambers 47 and 48. The outer wall of the latter chamber is provided with a port 114 arranged in alinement with the port 113 and communicating with the atmosphere. A valve 115 is slidable in the chamber 48 and is provided with an annular groove 116 affording communication between the ports 113 and 114 when the valve 115 is in the normal position shown in Figure 3. The lower end of the chamber 48 may be provided with a cap 117 vented to the atmosphere as at 118.

A diaphragm housing indicated as a whole by the numeral 119 comprises sections 120 and 121 having annular flanges between which a diaphragm 122 is secured by bolts 123. The housing section 121 is provided with a hollow axial extension 124 threaded in the upper end of the valve chamber 48. A valve stem 125 is connected at its lower end to the valve 115 and at its upper end to the diaphragm 122. The housing section 120 is provided with a hollow axial extension 126 in which the upper end of a spring 127 is arranged. The lower end of this spring operates against the diaphragm 122 tending to move the latter to its lower limit of movement whereby the valve 115 tends to move to the normal position shown in Figure 3. A screw 128 adjusts the tension of the spring 127 and determines the degree of differential pressure on opposite sides of the diaphragm 122 necessary to operate this element.

The diaphragm 122 forms with the housing section 121 a chamber 129 communicating with the atmosphere through a port 130. In a similar manner, the diaphragm forms with the upper housing section 120 a chamber 131 communicating with a port 132 formed in a boss 133 carried by and extending from the housing section 120. As previously stated, one end of the pipe 90 is connected to the reduced upper end of the run of the T 87 and the other end of the pipe 90 is connected to the boss 133 by a union 134.

The operation of the apparatus is as follows:
It will be apparent that the shaft 71 may be rocked by depression of the lower end of the treadle 79, and this action may take place regardless of the throttle position since the hinged connection for the lower end of the treadle permits depression thereof regardless of the position of the upper end of the treadle. On the other hand, it will be apparent that the throttle may be operated through its entire range of movement by operation of the upper end of the treadle without affecting the clutch since the upper end of the treadle is freely movable without depressing the lower end of the treadle.

When it is desired to release the clutch elements, the rear end of the treadle is depressed, preferably simultaneously with the releasing of the upper end of the treadle to permit the engine to idle. Depression of the lower end of the treadle moves the roller 83 and crank arm 84 downwardly, thus rocking the shaft 71 and moving the arm 70 of the shaft downwardly. This action in turn exerts a downward pull upon the link 68, thus moving the arm 66 of the rod 60 downwardly, whereupon the rod 60 will rock about its axis against the tension of the spring 61. The rocking movement of the rod 60 causes the arm 62 to swing upwardly, and this movement is transmitted through the link 64 and stem 56 to the valve 49, and thus the valve will be moved to its upper limit of movement.

When the valve is thus moved to its upper or operative position, the upper head 50 uncovers the port 91; while the lower valve head 51 covers the port 106. Under such conditions, the ports 85 and 91 will communicate with each other around the valve shank 52, and accordingly the upper casing section 19 of the power device will be placed in communication with the intake manifold through the conduits 86 and 93 and their associated connections. Thus differential pressure will be established in the power device and the atmospheric pressure beneath the diaphragm 22 will effect upward movement of the diaphragm and shaft 33, whereupon a pull will be exerted upon the cable 40 to move the clutch pedal 15 downwardly and completely disengage the clutch elements. While the cable 40 is shown as being connected to a standard clutch pedal 15, it will be apparent that any suitable connection may be made to release the clutch elements upon operation of the power device.

It will be apparent that the chamber 131 (see Figure 4) is always in communication with some portion of the vacuum space defined by the conduit 86 and T 87 and the space above the diaphragm 22. The pipe 90 provided for this purpose is shown connected to the upper end of the T 87, but it will be apparent that it readily may be connected to the conduit 86 or the interior of the upper casing section 19. Accordingly it will be apparent that when the air in the upper casing section 19 is evacuated upon the operation of the valve 49, the air also is exhausted from the pipe 90 and the chamber 131, whereupon atmospheric pressure beneath the diaphragm 122 moves the diaphragm upwardly against the tension of the spring 127, thus moving the valve 115 to its upper limit of movement at which point both of the ports 113 and 114 are uncovered. At this time, however, air cannot flow through the ports referred to into the valve chamber 47 since the inner end of the port 113 will be covered by the valve head 51.

From the foregoing it will be apparent that upward movement of the valve 49 by depression of the lower end of the treadle 79 effects movement of the clutch elements to released position, and accordingly the operator is free to shift gears without operating the clutch pedal. Assuming that the operation previously described has taken place with the vehicle at rest and with the gear shift lever in neutral position, the operator will place the gear shift lever in low gear position, whereupon it merely is necessary to release the lower end of the treadle 79 and depress the forward end thereof. As is well known, it is desirable to permit the clutch elements to come into engagement more slowly when the vehicle is in low gear than when it is in second or high gears, and this operation takes place automatically in a manner to be described upon the depression of the upper end of the treadle 79.

When the lower end of the treadle is released after the gear shift lever has been placed in low gear position, the spring 61 operates to return the parts connected thereto to normal position, the valve 49 moving downwardly to the position illustrated in Figures 2 and 3. At such time, it will be apparent that the vacuum port 91 again will be covered by the valve head 50 while the port 113 will be uncovered by downward movement of the valve head 51. As previously stated, the valve 115 moves upwardly when corresponding movement of the diaphragm 22 takes place, and accordingly the space in the valve chamber 47 surrounding the shank 52 will be connected to the atmosphere through ports 113 and 114 the instant the valve head 51 passes downwardly beyond the port 113. Under such conditions, air will rush through ports 114 and 113 into the valve chamber 47 around the shank 52, and then into the upper casing section 19 through port 85, conduit 86 and T 87.

The movement of air in the manner referred to immediately reduces the pressure differential on opposite sides of the diaphragm 22, whereupon the diaphragm is promptly caused to move downwardly by the action of the usual clutch springs (not shown). It also will be apparent that the building up of pressure to some extent in the power device through the passage of air in the manner described also affects the operation of the diaphragm 122, the pressure above this diaphragm preferably being built up to a sufficient extent to reduce the pressure differential on opposite sides of the diaphragm to permit the spring 127 to move the diaphragm downwardly sufficiently to cause the valve 115 to partially close the ports 113 and 114 and thus reduce their effective area for permitting air to flow to the upper casing section 19.

The operation referred to obviously reduces the vacuum in the upper casing section 19 below the point necessary for holding the diaphragm 22 against downward movement, and accordingly the clutch springs move the clutch elements toward operative engagement and such movement is transmitted to the diaphragm 22 to move it downwardly. The flow of air in the manner referred to above is restricted in accordance with the ports 113 and 114, and in practice the flow of air is insufficient to satisfy the vacuum existing in the upper casing section 19. In this connection, it is pointed out that the pressure built up in the casing section 19 will be dependent upon three conditions, namely the area of the diaphragm 22, the tension of the clutch springs tending to move the diphragm downwardly, and the effective area of the ports 113 and 114. The tension of the spring 127 is readily adjustable by operating the screw 128 to secure proper operation of the diaphragm 122 under the correct conditions of differential pressure whereby the valve 15 moves downwardly to the intermediate position previously referred to wherein the ports 113 and 114 are partially closed. At such point, the differential pressure still existing on opposite sides of the diaphragm 22 by virtue of the relatively rapid downward movement of this diaphragm is sufficient to prevent further downward movement of the diaphragm 122 and its associated valve 115, and accordingly the ports 114 and 113 will remain partially open to permit air to continue to flow into the casing section 19.

Further downward movement of the valve 115 will then depend upon the creation of increased pressure in the casing section 19, and such increased pressure is attained substantially at the instant when the clutch plates initially contact. This initial engagement of the clutch plates retards movement of the diaphragm 22 sufficiently to change the ratio between the three conditions referred to above, namely the area of the diaphragm 22, the rate of downward movement of this diaphragm, and the effective areas of the ports 113 and 114. Under such conditions, the effective areas of the ports 113 and 114 will be sufficient to raise the pressure in the casing section 19 and this increased pressure is communicated to the diaphragm chamber 131, thus permitting the spring 127 to move the valve 115 downwardly to fully closed position thus preventing the flow of additional air through the ports 113 and 114.

In this connection it should be noted that the differential pressure existing on opposite sides of the diaphragm 22 as it moves downwardly is only slightly below the differential pressure necessary to hold this diaphragm stationary, and accordingly a sufficient increase in pressure in the casing section 19 to drop the valve 115 to closed position occurs substantially instantaneously upon initial contact of the clutch plates, and accordingly movement of the parts will be completely arrested before the clutch plates move into substantial contact with each other. In fact, the degree of engagement of the clutch plates at the time their movement is arrested is insufficient to transmit any motion to the vehicle.

The operation thus far described covers the complete releasing of the clutch elements, the placing of the gearshift lever in low gear position, and the automatic releasing of the clutch elements to move rapidly to a point at which the clutch elements lightly contact, whereupon it is necessary only to effect slight further movement of the clutch elements to bring them into operative engagement. It will be apparent that the movement of the clutch elements into light contact with each other takes place automatically and very rapidly, and accordingly it will be apparent that the vehicle is ready to proceed practically instantaneously with the releasing of the lower end of the treadle 79. After this action is performed, it merely is necessary for the operator to depress the upper end of the treadle 79. As previously stated, it is the common practice in the conventional operation of motor vehicles to permit the clutch elements to move slowly into engagement with each other when in low gear, and at such time the throttle of the vehicle is slowly opened to permit a gradual picking up in the momentum of the vehicle. Accordingly, when the operator depresses the upper end of the treadle 79, he performs this operation relatively slowly and a corresponding relatively slow movement of the clutch elements into engagement with each other takes place, and the latter action is wholly automatic. Upon the depression of the upper end of the treadle 79 in the manner referred to and the corresponding relatively slow movement of the throttle toward open position, the degree of vacuum in the intake manifold is relatively slightly reduced, or in other words, the pressure in the intake manifold slightly increases. This slight increase in manifold pressure is communicated to the diaphragm chamber 111 through conduit 93, T 92 and pipe 97.

A slight increase in pressure in the chamber 111 obviously slightly reduces the pressure differential on opposite sides of the diaphragm 101, whereupon the spring 109 operates to move the diaphragm 101 to a slight extent, thus slightly opening the valve 104. Since the chamber 106' communicates with the atmosphere through port 107, it will be apparent that the slight opening of the valve 104 permits a slow movement of air into the valve chamber around the shank 52, and this air flows into the upper portion of the power device through pipe 86 and T 87. The pressure differential on opposite sides of the diaphragm 22 accordingly is slowly reduced, and the diaphragm moves downwardly to permit the clutch elements to come into engagement relatively slowly. The operator continues to depress the upper end of the treadle 79 until the vehicle has attained sufficient momentum whereupon the lower end of the treadle is depressed and the upper end released, preferably simultaneously whereupon the clutch again will become disengaged and the vehicle is ready to be placed in second gear. It will be apparent that the continued feeding of air into the upper end of the power device to complete the engagement of the clutch elements establishes pressure equalization in the upper chamber of the power device and consequently in the chamber 131. Accordingly the diaphragm 122 moves to its lower limit together with the valve 115, and the groove 116 communicates between the ports 113 and 114 to normally connect the power device to the atmosphere and prevent danger of upward creeping of the diaphragm 22.

The operation of the device when the vehicle is in second gear is substantially identical with that previously described and need not be referred to in detail. As is well known, the operator of a motor vehicle may permit somewhat more rapid clutch element engagement in second gear than in low gear due to the momentum of the vehicle, and such increased speed of movement of the clutch elements into engagement under such conditions usually is practiced by the average driver together with a more rapid operation of the accelerator. The present apparatus acts automatically to bring the clutch elements into engagement at a rate corresponding to the rapidity of the opening of the throttle. When the vehicle is in second gear, it merely is necessary for the operator to depress the upper end of the treadle 79 somewhat more rapidly than when in low gear, and this action through the more rapid opening of the throttle decreases the degree of vacuum in the manifold to a greater extent. Accordingly the somewhat more rapid increase in the pressure in the intake manifold is communicated to the diaphragm chamber 111, thus more greatly reducing the pressure differential on opposite sides of the diaphragm, whereupon the spring 109 opens the valve 104 to a greater extent than when in low gear. This operation in turn permits the more rapid flow of air into the top of the power device, and more rapid downward movement of the diaphragm takes place together with more rapid movement of the clutch elements into engagement with each other.

The operation is repeated in high gear except that even more rapid clutch engagement takes place, and this condition is taken care of merely by more rapidly depressing the upper end of the treadle 79. Such action obviously opens the valve 104 to an even greater extent than in the case previously described, and the clutch elements accordingly will move relatively rapidly into operative engagement.

From the foregoing description it will be apparent that the present apparatus provides novel means for operating and controlling the clutch of a motor vehicle without the necessity of having to operate the clutch pedal in accordance with conventional practice. The movement of the clutch to inoperative position and the return of the clutch elements to a point where they lightly contact with each other, is controlled wholly by the movement of the lower end of the treadle 79. The movement of the clutch elements into complete engagement is controlled by the throttle operation. The movement of the clutch elements to inoperative position obviously is wholly independent of the throttle, the latter being movable throughout its complete range of movement without affecting the clutch in any way. In fact, the clutch is operable regardless of the position of the throttle since the rear end of the treadle 79 may be depressed at any time to effect de-clutching.

The provision of the vacuum controlled means for checking the movement of the clutch elements substantially at the point of initial engagement is highly flexible but accurate in operation, and in actual practice, it has been found that proper checking movement of a clutch takes place over long periods of time and upon readjustment of the clutch elements without adjusting any of the parts of the clutch operating means. This is due to the fact that the retarding of movement of the diaphragm 22 at any time during its downward movement will effect an increase in pressure in the casing section 19 to drop the valve 115 to closed position. Accordingly the adjustment of a vehicle clutch to cause clutch engagement to take place at different points in the travel of the clutch pedal will not affect the operation of the present device in any manner. This fact is of extreme importance since with prior constructions it was necessary to secure exact adjustment of the clutch operating means with respect to the point of engagement of the clutch since rough operation and excessive wear of the clutch facings would occur unless such exact adjustments were provided.

While the operation of the device has been described with the valve 115 initially movable downwardly to such a point as to restrict the ports 113 and 114, such operation is desirable only for the purpose of permitting an initial relatively great flow of air into the diaphragm casings to secure rapidity of operation. It will be apparent however, that the ports 113 and 114 may be of a size corresponding to their effective area upon initial downward movement of the valve 115 in which case it will be apparent that such initial movement of the valve does not partially close or in any way affect the ports 113 and 114 until initial contact of the clutch elements takes place to drop the valve 115 to closed position.

It also will be apparent that flexibility of the control of the movement of the clutch elements into operative engagement is provided without the necessity of varying the speed of clutch engagement in accordance with gearshift lever position, the rapidity of clutch element engagement being dependent wholly upon the pressure in the intake manifold.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. Apparatus of the character described comprising a pressure responsive device connected to a motor vehicle clutch and operative for moving the clutch elements out of engagement with each other, means for supplying vacuum to said pressure responsive device to render it operative, means for at least partially releasing the vacuum acting on said pressure responsive device to release the clutch elements for movement toward operative engagement with each other, means rendered operative by initial contact of the clutch elements with each other for arresting the motion of the clutch elements toward operative engagement, and means for releasing the clutch elements for movement into operative engagement after their movement has been arrested by said last named means.

2. Apparatus of the character described comprising a pressure responsive device connected to a motor vehicle clutch, a conduit connected to a source of suction and to said device and operative for connecting said device to the source of suction to move the clutch elements out of engagement with each other, means operative to admit atmospheric pressure to said conduit to release the clutch elements for movement toward operative engagement, said pressure responsive device operating to maintain a partial vacuum in said conduit during movement of the clutch plates toward operative engagement, means actuated by a drop in vacuum in said conduit occurring upon initial contact of the clutch elements for arresting movement of the clutch elements toward operative engagement, and means for releasing the clutch elements for movement into operative engagement after their movement has been arrested by said last named means.

3. Apparatus of the character described comprising a pressure responsive device connected to a motor vehicle clutch, a conduit connected to a source of suction and to said device and operative for connecting said device to the source of suction to move the clutch elements out of engagement with each other, means operative to admit atmospheric pressure to said conduit to release the clutch elements for movement toward operative engagement, said pressure responsive device operating to maintain a partial vacuum in said conduit during movement of the clutch elements toward operative engagement, a diaphragm actuated valve operable to closed position by a drop in vacuum in said passage occurring upon initial contact of the clutch elements for arresting movement of the clutch elements toward operative engagement, and means for releasing the clutch elements for movement into operative engagement after their movement has been arrested by said last named means.

4. Apparatus of the character described comprising a power device having a casing provided with a pressure responsive member to form a suction chamber, said pressure responsive member being connected to an operating member of a motor vehicle clutch, a valve operable in one position for connecting said chamber to a source of suction to effect clutch disengagement, said valve being movable to a second position to connect said chamber to the atmosphere and release the clutch elements for movement toward engaged position, an auxiliary valve movable upon initial contact of the clutch elements for closing communication between said chamber and the atmosphere, and means operative for affording communication between said chamber and the atmosphere after said auxiliary valve has moved to closed position.

5. Apparatus of the character described comprising a power device having a casing provided with a pressure responsive member to form a suction chamber, said pressure responsive member being connected to an operating member of a motor vehicle clutch, a valve operable in one position for connecting said chamber to a source of suction to effect clutch disengagement, said valve being movable to a second position to connect said chamber to the atmosphere and release the clutch elements for movement toward engaged position, an auxiliary valve, means connected to said auxiliary valve and operative by pressure in said suction chamber upon initial contact of the clutch elements for closing communication between said chamber and the atmosphere, and means operative for affording communication between said chamber and the atmosphere after said auxiliary valve has moved to closed position.

6. Apparatus of the character described comprising a power device having a casing provided with a pressure responsive member to form a suction chamber, said pressure responsive member being connected to an operating member of a motor vehicle clutch, a valve operable in one position for connecting said chamber to a source of suction to effect clutch disengagement, said valve being movable to a second position to connect said chamber to the atmosphere and release the clutch elements for movement toward engaged position, an auxiliary valve, an expansible chamber device having an operating member connected to said auxiliary valve and responsive to pressure in said suction chamber upon initial contact of the clutch elements for closing communication between said chamber and the atmosphere, and means operative for affording communication between said suction chamber and the atmosphere after said auxiliary valve has moved to closed position.

7. Apparatus of the character described comprising a power device having a casing provided with a pressure responsive member to form a suction chamber, said pressure responsive member being connected to an operating member of a motor vehicle clutch, a valve operable in one position for connecting said chamber to a source of suction to effect clutch disengagement, said valve being movable to a second position to connect said chamber to the atmosphere and release the clutch elements for movement toward engaged position, an auxiliary valve, a housing, a diaphragm mounted in said housing and connected to said auxiliary valve and operative by pressure in said suction chamber upon initial engagement of the clutch elements for closing communication between said chamber and the atmosphere, and means operative for affording communication between said chamber and the atmosphere after said auxiliary valve has moved to closed position.

8. Apparatus of the character described comprising a power device having a casing provided with a pressure responsive member to form a suction chamber, said pressure responsive member being connected to an operating member of a motor vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve movable to operative position to close said port, pressure responsive means connected to said auxiliary valve and operable for moving the latter to operative position under the influence of pressure in said chamber upon initial contact of the clutch elements, and means operative for affording communication between said suction chamber and the atmosphere after said auxiliary valve has moved to operative position.

9. Apparatus of the character described comprising a power device having a casing provided with a pressure responsive member to form a suction chamber, said pressure responsive member being connected to an operating member of a motor vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve, a pressure responsive device connected to said auxiliary valve and communicating with said chamber to be operated by suction therein to move said auxiliary valve in one direction to a position uncovering said port, resilient means tending to move said auxiliary valve in the opposite direction, said pressure responsive device being operative by said resilient means to move said auxiliary valve to a position closing said port upon initial contact of the clutch elements, and means operative for affording communication between said chamber and the atmosphere after said auxiliary valve has moved to closed position.

10. Apparatus of the character described comprising a power device having a casing provided with a pressure responsive member to form a suction chamber, said pressure responsive member being connected to an operating member of a motor vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve, a diaphragm casing, a diaphragm arranged in said casing and connected to said auxiliary valve, spring means urging said auxiliary valve in one direction, said diaphragm casing communicating with said chamber whereby said diaphragm is moved by suction in said chamber when said first named valve is in said second position to move said auxiliary valve in the other direction to a position uncovering said port, said resilient means being operative to move said auxiliary valve to an operative position closing said port upon initial contact of the clutch elements, and means operative for affording communication between said suction chamber and the atmosphere after said auxiliary valve has moved to operative position.

11. Apparatus of the character described comprising a differential pressure power device having a casing provided with a movable member to form a suction chamber, said movable member being connected to an operating member of a motor vehicle clutch, a conduit adapted to connect the suction chamber to the intake manifold of the motor vehicle engine, a valve controlling said conduit and adapted to assume a position connecting said chamber to the atmosphere, said valve being movable to an operative position to disconnect said chamber from the atmosphere and to open said conduit, means operative upon initial contact of the clutch elements when said valve moves to said first named position for rendering said valve ineffective for connecting said chamber to the atmosphere whereby movement of the clutch elements will be arrested, and means for affording comunication between said chamber and the atmosphere after movement of the clutch elements has been arrested for permitting the clutch elements to move into operative engagement with each other.

12. The combination with a motor vehicle clutch having a normal bias to operative condition with the elements thereof in engagement with each other, of a pressure responsive device connected to the clutch and operative for moving the clutch elements out of engagement with each other, means for supplying vacuum to said pressure responsive device to render it operative, means for at least partially releasing the vacuum acting on said pressure responsive device to release the clutch elements for movement toward operative engagement with each other, means rendered operative by initial contact of the clutch elements with each other for arresting the motion of the clutch elements toward operative engagement, and means for releasing the clutch elements for movement into operative engagement after their movement has been arrested by said last named means.

13. The combination with a motor vehicle clutch having a normal bias to operative condition with the elements thereof in engagement with each other, of a pressure responsive device connected to an operating member of the clutch, a conduit connected to a source of suction and to said device and operative for connecting said device to the source of suction to move the clutch elements out of engagement with each other, means operative to admit atmospheric pressure to said conduit to release the clutch elements for movement toward operative engagement, said pressure responsive device operating to maintain a partial vacuum in said conduit during movement of the clutch plates toward operative engagement, means actuated by a drop in vacuum in said conduit occurring upon initial contact of the clutch elements for arresting movement of the clutch elements toward each other, and means for releasing the clutch elements for movement into operative engagement after their movement has been arrested by said last named means.

14. The combination with a motor vehicle clutch having a normal bias to operative condition with the elements thereof in engagement with each other, of a conduit connected to a source of suction and to said device and operative for connecting said device to the source of suction to move the clutch elements out of engagement with each other, means operative to admit atmospheric pressure to said conduit to release the clutch elements for movement toward operative engagement, said pressure responsive device operating to maintain a partial vacuum in said conduit during movement of the clutch elements toward operative engagement, a diaphragm actuated valve operable to closed position by a drop in vacuum in said passage occurring upon initial contact of the clutch elements for arresting movement of the clutch elements toward operative engagement, and means for releasing the clutch elements for movement into operative engagement after their movement has been arrested by said last named means.

15. The combination with a motor vehicle clutch having a normal bias to operative condition with the elements thereof in engagement with each other, of a power device having a casing provided with a pressure responsive member to form a suction chamber, said pressure responsive member being connected to the clutch, a valve operable in one position for connecting said chamber to a source of suction to effect clutch disengagement, said valve being movable to a second position to connect said chamber to the atmosphere and release the clutch elements for movement toward engaged position, an auxiliary valve movable upon initial contact of the clutch elements for closing communication between said chamber and the atmosphere, and means operative for affording communication between said chamber and the atmosphere after said auxiliary valve has moved to closed position.

16. The combination with a motor vehicle clutch having a normal bias to operative condition with the elements thereof in engagement with each other, of a power device having a casing provided with a pressure responsive member to form a suction chamber, said pressure responsive member being connected to an operating member of the clutch, a valve operable in one position for connecting said chamber to a source of suction to effect clutch disengagement, said valve being movable to a second position to connect said chamber to the atmosphere and release the clutch elements for movement toward engaged position, an auxiliary valve, means connected to said auxiliary valve and operative by pressure in said suction chamber upon initial contact of the clutch elements for closing communication between said chamber and the atmosphere, and means operative for affording communication between said chamber and the atmosphere after said auxiliary valve has moved to closed position.

17. The combination with a motor vehicle clutch having a normal bias to operative condition with the elements thereof in engagement with each other, of a power device having a casing provided with a pressure responsive member to form a suction chamber, said pressure responsive member being connected to an operating member of the clutch, a valve operable in one position for connecting said chamber to a source of suction to effect clutch disengagement, said valve being movable to a second position to connect said chamber to the atmosphere and release the clutch elements for movement toward engaged position, an auxiliary valve, an expansible chamber device having an operating member connected to said auxiliary valve and responsive to pressure in said suction chamber upon initial contact of the clutch elements for closing communication between said chamber and the atmosphere, and means operative for affording communication between said chamber and the atmosphere after said auxiliary valve has moved to closed position.

18. The combination with a motor vehicle clutch having a normal bias to operative condition with the elements thereof in engagement with each other, of a power device having a casing provided with a pressure responsive member to form a suction chamber, said pressure responsive member being connected to an operating member of the vehicle clutch, a valve operable in one position for connecting said chamber to a source of suction to effect clutch disengagement, said valve being movable to a second position to connect said chamber to the atmosphere and release the clutch elements for movement toward engaged position, an auxiliary valve, a housing, a diaphragm mounted in said housing and connected to said auxiliary valve and operative by pressure in said suction chamber upon initial engagement of the clutch elements for closing communication between said chamber and the atmosphere, and means operative for affording communication between said chamber and the atmosphere after said auxiliary valve has moved to closed position.

19. The combination with a motor vehicle clutch having a normal bias to operative condition with the elements thereof in engagement with each other, of a power device having a casing provided with a pressure responsive member to form a suction chamber, said pressure responsive member being connected to an operating member of the vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve movable to operative position under the influence of pressure in said chamber upon initial contact of the clutch elements for closing communication through said port, and means operative for affording communication between said suction chamber and the atmosphere after said auxiliary valve is moved to operative position.

20. The combination with a motor vehicle clutch having a normal bias to operative condition with the elements thereof in engagement with each other, of a power device having a casing provided with a pressure responsive member to form a suction chamber, said pressure responsive member being connected to an operating member of the vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve movable to operative position to close said port, pressure responsive means connected to said auxiliary valve and operable for moving the latter to operative position under the influence of pressure in said chamber upon initial contact of the clutch elements, and means operative for affording communication between said suction chamber and the atmosphere after said auxiliary valve has moved to operative position.

21. The combination with a motor vehicle clutch having a normal bias to operative condition with the elements thereof in engagement with each other, of a power device having a casing provided with a pressure responsive member to form a suction chamber, said pressure responsive member being connected to an operating member of the vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve, a pressure responsive device connected to said auxiliary valve and communicating with said chamber to be operated by suction therein to move said auxiliary valve in one direction to a position uncovering said port, resilient means tending to move said auxiliary valve in the opposite direction, said pressure responsive device being operative by said resilient means to move said auxiliary valve to a position closing said port upon initial contact of the clutch elements, and means operative for affording communication between said chamber and the atmosphere after said auxiliary valve has moved to closed position.

22. The combination with a motor vehicle clutch having a normal bias to operative condition with the elements thereof in engagement with each other, of a power device having a casing provided with a pressure responsive member to form a suction chamber, said pressure responsive member being connected to an operating member of the vehicle clutch, a valve housing having an atmospheric port, a valve movable to one position in said valve housing to connect said chamber to the atmosphere through said port and movable to a second position to disconnect said chamber from the atmosphere and connect it to a source of suction, an auxiliary valve, a diaphragm casing, a diaphragm arranged in said diaphragm casing and connected to said auxiliary valve, spring means urging said auxiliary valve in one direction, said diaphragm casing communicating with said chamber whereby said diaphragm is moved by suction in said chamber when said first named valve is in said second position to move said auxiliary valve in the other direction to a position uncovering said port, said auxiliary means being operative to move said auxiliary valve to an operative position closing said port upon initial contact of the clutch elements, and means operative for affording communication between said suction chamber and the atmosphere after said auxiliary valve has moved to operative position.

23. The combination with a motor vehicle clutch having a normal bias to operative condition with the elements thereof in engagement with each other, of a differential pressure power device having a casing provided with a movable member to form a suction chamber, said movable member being connected to an operating member of the vehicle clutch, a conduit adapted to connect the suction chamber to the intake manifold of the motor vehicle engine, a valve controlling said conduit and adapted to assume a position connecting said chamber to the atmosphere, said valve being movable to an operative position to disconnect said chamber from the atmosphere and to open said conduit, means operative upon initial contact of the clutch elements when said valve moves to said first named position for rendering said valve ineffective for connecting said chamber to the atmosphere whereby movement of the clutch elements will be arrested, and means for affording communication between said chamber and the atmosphere after movement of the clutch elements has been arrested for permitting the clutch elements to move into operative engagement with each other.

24. In a system of the class described, a clutch having parts movable into and out of clutching engagement with each other, means normally holding said clutch parts in engagement with each other, pressure responsive means for moving said clutch parts out of engagement with each other, means for supplying vacuum to said pressure responsive means to cause the same to move said clutch parts to disengaged position, means for releasing the vacuum acting on said pressure responsive means whereby said first mentioned means moves said clutch parts toward clutching engagement with each other, means for arresting the motion of said clutch parts toward clutching engagement upon partial contact of said clutch parts, and means operative, after the operation of said means arresting the motion of said clutch parts, to progressively control the degree of vacuum acting on said pressure responsive member whereby the degree of pressure between said clutch parts is progressively controlled.

EDWARD G. HILL.
HENRY W. HEY.